(12) United States Patent  (10) Patent No.: US 9,122,535 B2
Soundararajan et al.  (45) Date of Patent: Sep. 1, 2015

(54) OPTIMIZING DISTRIBUTED DATA ANALYTICS FOR SHARED STORAGE

(75) Inventors: Gokul Soundararajan, Sunnyvale, CA (US); Madalin Mihailescu, Toronto (CA)

(73) Assignee: NetApp, Inc., Sunnyvale, CA (US)

( * ) Notice: Subject to any disclaimer, the term of this patent is extended or adjusted under 35 U.S.C. 154(b) by 351 days.

(21) Appl. No.: 13/302,306

(22) Filed: Nov. 22, 2011

(65) Prior Publication Data

US 2013/0132967 A1  May 23, 2013

(51) Int. Cl.
*G06F 9/46* (2006.01)
*G06F 9/50* (2006.01)

(52) U.S. Cl.
CPC .................................. *G06F 9/5066* (2013.01)

(58) Field of Classification Search
USPC .................................................. 718/102, 104
See application file for complete search history.

(56) References Cited

U.S. PATENT DOCUMENTS

| | | | |
|---|---|---|---|
| 6,092,097 A * | 7/2000 | Suzuoka ........................ | 709/201 |
| 6,560,631 B1 * | 5/2003 | Ishihara et al. ................ | 709/201 |
| 8,312,037 B1 * | 11/2012 | Bacthavachalu et al. ...... | 707/769 |
| 8,418,181 B1 * | 4/2013 | Sirota et al. .................... | 718/102 |
| 2007/0124731 A1 * | 5/2007 | Neiman et al. ................. | 718/100 |
| 2007/0271414 A1 * | 11/2007 | Nakatani et al. ............... | 711/113 |
| 2011/0222540 A1 * | 9/2011 | Mital et al. ..................... | 370/392 |
| 2011/0302151 A1 * | 12/2011 | Abadi et al. ................... | 707/714 |
| 2011/0313973 A1 * | 12/2011 | Srivas et al. ................... | 707/634 |
| 2012/0166694 A1 * | 6/2012 | Dosh ............................. | 710/110 |

OTHER PUBLICATIONS

Headlund, Understanding Hadoop Clusters and the Network, Brad Hedlund.com, Sep. 2011, 26 pages.*

* cited by examiner

*Primary Examiner* — Diem Cao
(74) *Attorney, Agent, or Firm* — Perkins Coie LLP

(57) ABSTRACT

Methods, systems, and computer executable instructions for performing distributed data analytics are provided. In one exemplary embodiment, a method of performing a distributed data analytics job includes collecting application-specific information in a processing node assigned to perform a task to identify data necessary to perform the task. The method also includes requesting a chunk of the necessary data from a storage server based on location information indicating one or more locations of the data chunk and prioritizing the request relative to other data requests associated with the job. The method also includes receiving the data chunk from the storage server in response to the request and storing the data chunk in a memory cache of the processing node which uses a same file system as the storage server.

27 Claims, 8 Drawing Sheets

OPTIMIZING DISTRIBUTED DATA ANALYTICS FOR SHARED STORAGE

TECHNICAL FIELD

Various embodiments of the present application generally relate to the field of distributed data analytics processing. More specifically, various embodiments of the present application relate to methods and systems for performing distributed data analytics at processing nodes that cache data from a shared storage system.

BACKGROUND

A distributed computing system comprises multiple computers, computing nodes, or processing nodes which operate independently, or somewhat independently, to achieve or provide results toward a common goal. Distributed computing may be chosen over a centralized computing approach for many different reasons. For example, in some cases, the system or data for which the computing is being performed may be inherently geographically distributed, such that a distributed approach is the most logical solution. In other cases, using multiple processing nodes to perform pieces of the processing job may be a more cost effective solution than using a single computing system, with much more processing power, that is capable of performing the job in its entirety. In other cases, a distributed approach may be preferred in order to avoid a system with a single point of failure or to provide redundant instances of processing capabilities. While processing nodes in parallel computing arrangements often have shared memory or memory resources, processing nodes in distributed computing arrangements typically use some type of local or private memory.

A variety of jobs can be performed using distributed computing. In some cases, commonly referred to as distributed data analytics, the data sets are very large and the analysis performed may span hundreds of thousands of processing nodes. In these cases, management of the data sets that are being analyzed becomes a significant and important part of the processing job. Software frameworks have been specifically developed for performing distributed data analytics on large data sets. MapReduce is one example of such a software framework for performing distributed data analytics processes on large data sets using multiple processing nodes. In a Map step of a MapReduce process, a job is divided up into smaller sub-jobs which are commonly referred to as tasks and are distributed to the processing nodes. The processing nodes perform these tasks independently and each produces intermediate results. The Reduce step, also utilizing a set of processing nodes, combines all of the individual intermediate results into an overall result. Apache Hadoop is a specific example of a software framework designed for performing distributed data analytics on very large data sets.

In distributed computing systems, the different portions or chunks that make up a full data set are often stored at or near the processing nodes that are performing analysis operations on them. The typical behavior is to schedule the tasks such that the data to be processed is available locally. In some cases, the data chunks may be moved between the processing nodes as different processing needs arise. In addition, multiple copies of the data set typically are created to satisfy data reliability and availability requirements. It is important to manage the data chunks such that storage space is not wasted by having too many instances of each data chunk, as well as managing changes to the data chunks. Dedicated file systems are used to manage the unique file management issues in distributed computing and analytics environments.

For example, Hadoop based systems use the Hadoop Distributed File System (HDFS). HDFS runs on top of the file systems of the underlying operating systems of the processing nodes and manages the storage of data sets and data chunks across the storage spaces associated with the nodes. This includes making the proper data chunks available to the appropriate processing nodes as well as replicating the data across nodes to satisfy data reliability and availability requirements. Nodes are often spread out over different geographic locations and at least one copy of the data is typically stored on multiple nodes in different geographic locations for backup purposes.

In addition to managing backup copies, data management and reliability activities may also need to access or manipulate the data chunks for other related purposes. The data management activities may include backup, archiving, mirroring, cleanup, compression, deduplication, and optimization. While these activities are being performed, access to the data chunks is typically still needed for analysis and processing purposes. Analysis performance can be degraded if data access is slowed or prohibited while the data is being accessed for these other purposes. Consequently, performance and reliability requirements often result in competing objectives.

In addition, moving data into or out of a specialized file system, such as HDFS, typically requires additional software activities, interfacing with other data management systems, tools, or processes and is often inefficient or cumbersome. Since distributed analytics processes typically utilize specialized file systems purpose-built for analytics, they lack many of the standard interfaces. In particular, legacy applications such as databases, source control, and productivity applications are unable to store data in the specialized file systems. Therefore, analysis of the data generated by these types of applications typically requires that the data be migrated or exported from the traditional file system and imported into the specialized file system before running an analytics job. This migration phase can be time consuming and tedious as it involves moving large amounts of data and must be performed every time data from the traditional file system is transferred.

SUMMARY

Methods and apparatuses for performing distributed data analytics are provided. A method of performing a distributed data analytics job includes collecting application-specific information in a processing node assigned to perform a task to identify necessary data to perform the task. The method also includes requesting a data chunk of the necessary data from a storage server based on location information indicating one or more locations of the data chunk and prioritizing the request relative to other data requests associated with the job. The method also includes receiving the data chunk from the storage server in response to the request and storing the data chunk in a cache of the processing node which uses a same file system as the storage server.

Using this method, data can easily be transferred between the processing nodes and the storage server without a need for interface software or tools compatible with the distributed processing environment of the processing node. Because the storage server is the primary storage location for the data sets, data management and/or reliability features can be implemented on the storage server without requiring their implementation in a specialized file system and without interfering with process activities occurring at the processing nodes.

Because data reliability functions do not rely on copies or portions of the data stored in caches of the processing nodes, the processing nodes are stateless and do not affect data reliability. This separation of the data reliability functions from the instances of the data used for processing allows the effectiveness of each of these functions to be maximized, while minimizing the impact of each on the other.

In one embodiment, an analytics system comprises a processing module, an application-level driver, a distributed data cache, a cache coordinator, and an input/output (I/O) coordinator. The processing module performs processing jobs while the application-level driver collects application-specific information from the processing module. The distributed data cache, operatively coupled with the driver and operatively coupled with a storage server, caches data for performing the processing jobs based on the application-specific information. The cache coordinator, operatively coupled between the distributed data cache and the processing module, retrieves from the storage server a portion of the data not located in the distributed data cache based on location information indicating one or more locations of the data portion. The I/O coordinator prioritizes I/O operations between the distributed data cache and the storage server. Advantageously, the distributed data cache uses the same type of file system as the storage server. A file system logically organizes the stored data as a hierarchical structure of logical data containers (e.g., volumes, logical units, directories, and/or files) on the storage media.

In some cases, a data analysis job includes multiple tasks. Some of these tasks may be assigned to other processing modules. The other processing modules obtain the necessary data for their tasks in a manner similar to that described above. In some cases, the assignment and performance of the tasks is implemented as a Map step of a MapReduce process. When the tasks are complete, the processing modules provide the intermediate results of the tasks to a central processing node that combines the results to generate an overall result of the analytics processing job. This process may be managed or coordinated by a job manager. In the case of MapReduce, this combining step is typically referred to as the Reduce step.

Because the storage server maintains the primary copies of the data, performs the data management functions, and does not rely on the copies of data residing in the distributed cache of the processing nodes for data reliability purposes, the distributed cache is stateless and loss of data from the distributed data cache does not affect the data reliability scheme. Data management and reliability functions may be performed at the storage server with little effect on the performance of the analytics processes being performed at the processing modules. Because the storage server performs these functions independent of the distributed processing environment, storage servers and software tools may be used without having to modify or configure them to operate in or interface with the distributed processing environment. Neither the computational bandwidth of the processing modules nor access to the data to perform the processing is directly impacted by the data management and reliability functions performed at the storage server. This approach allows a system operator to more easily manage the storage space associated with the system as well as add storage capacity or features using industry standard solutions.

Embodiments of the present invention also include other methods, systems with various components, and non-transitory machine-readable storage media containing instructions which, when executed by one or more processors, direct the one or more processors to perform the methods, variations of the methods, or other operations described herein. While multiple embodiments are disclosed, still other embodiments will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present invention will be described and explained through the use of the accompanying drawings in which.

Figure 1:
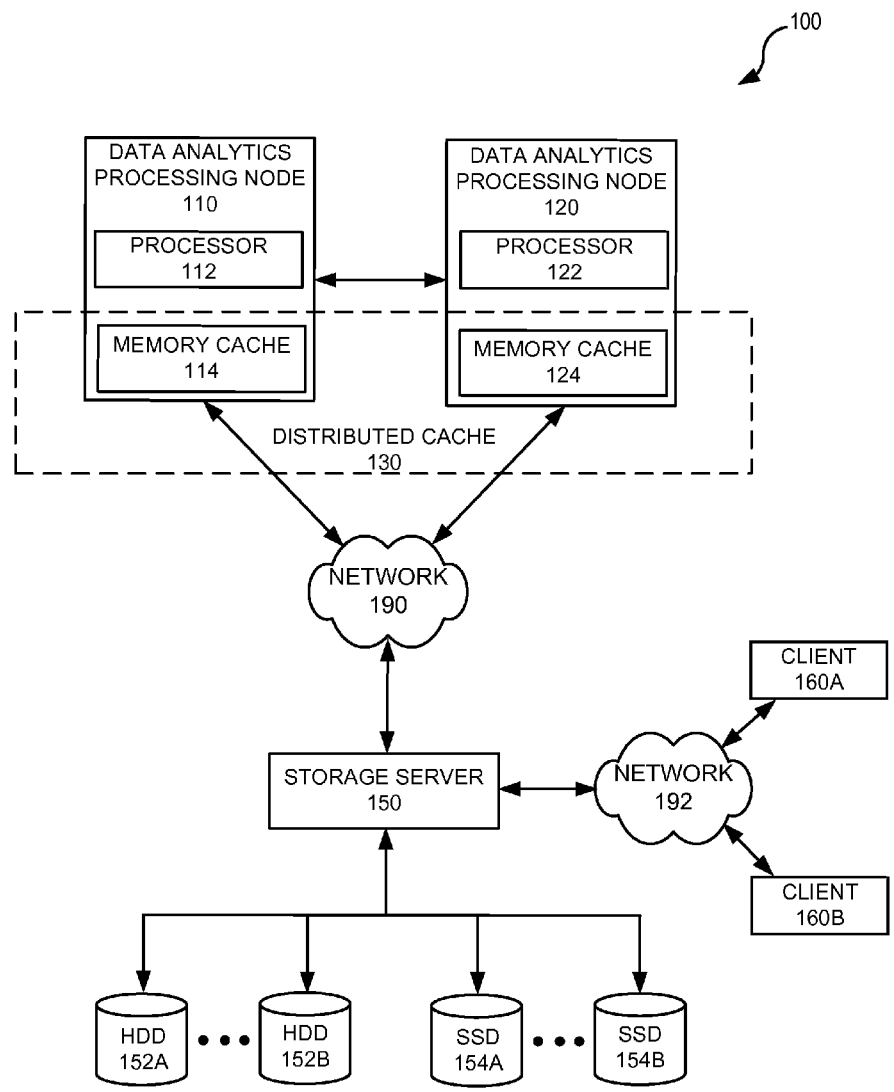
FIG. 1 illustrates an operating environment in which some embodiments of the present invention may be utilized.

The drawings have not necessarily been drawn to scale. For example, the dimensions of some of the elements in the figures may be expanded or reduced to help improve the understanding of the embodiments of the present invention. Similarly, some components and/or operations may be separated into different blocks or combined into a single block for the purposes of discussion of some of the embodiments of the present invention. Moreover, while the invention is amenable to various modifications and alternative forms, specific embodiments are shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Various embodiments of the present application relate to the field of distributed data analytics processing. More specifically, various embodiments of the present application relate to methods and systems for performing distributed data analytics at processing nodes that cache data from a shared storage system. Some of the embodiments herein are described with respect to distributed data analytics systems which utilize MapReduce and Hadoop software frameworks. However, the invention is not limited to implementation in these particular software frameworks.

Distributed data analytics processing systems perform processing jobs using multiple computing or processing nodes, often in different physical locations. Jobs are broken into tasks and assigned to individual processing nodes or modules. The processing nodes or modules typically use local memory of some type to store data necessary to perform the assigned task. Availability of the data in local memory reduces latencies associated with retrieving the data from a separate system or remote location and improves processing speed. Specialized software frameworks have been developed for performing these types of processes in distributed environments. MapReduce is one example of such a software framework for performing distributed data analytics processes on large data sets using multiple processing nodes.

In some applications, the data sets are very large. In these cases, the management of the data sets and/or the data chunks being operated on by the processing nodes may become a significant part of the overall processing job. Software frameworks have been specifically developed for performing distributed data analytics on large data sets. Apache Hadoop is one example of a software framework designed for performing distributed data analytics on very large data sets. In order to meet the specialized data availability and reliability needs of this type of distributed data analytics system, Hadoop and other similar frameworks also utilize specialized file systems. For example, Hadoop based systems use the Hadoop Distributed File System (HDFS). HDFS runs on top of the file systems of the underlying operating systems of the processing nodes and manages the storage of data sets and data chunks across the storage spaces associated with the nodes. In this arrangement, the distributed file system must typically accommodate the processing needs of the nodes as well as perform data reliability functions.

In the case of a Hadoop implementation, each node serves up blocks of data over the network to nodes requiring the data for processing. The data is served using a block protocol which is specific to HDFS. Performance is optimized by maximizing the availability of data for each task in storage that is local to the node performing the task. In addition to making the appropriate data chunks available to the nodes, HDFS is also responsible for data management functions including replicating the data across nodes to satisfy a data reliability plan or data reliability requirements. In this way, HDFS mixes the data reliability and performance functions, because the copies of the data which reside in local storage at or near the node are placed there for performance of the node in processing the data as well as being a redundant instance of the data for reliability purposes. Consequently, there may be competing uses or needs for the data residing in the local storage of the nodes. In addition, transferring data into and out of the Hadoop environment is burdensome because storage servers and other file management systems typically do not support HDFS and HDFS does not support the industry-standard file system interfaces. Therefore, movement of data chunks into or out of the distributed data analytics environment requires additional tools or specialized interfaces to move between the different file systems.

The present invention resolves this and other problems by implementing a caching layer at the processing nodes which decouples the file management activities performed on the storage server from the processing activities occurring at the processing node. This is accomplished by replacing the file management tier at the processing node with a stateless caching tier and storage server which independently satisfy the processing needs and the file management needs, respectively. In this way, the storage server may perform file management activities including backup, cleanup, compression, archiving, mirroring, deduplication, and optimization with minimal impact on the throughput of the processing activities at the processing nodes. The stateless caching tier and the storage server utilize the same type of file system such that transfer of data between the two does not require transfer into or out of a specialized file management system, such as HDFS. File systems that can be used in the storage server include Write Anywhere File Layout (WAFL), Third Extended File System (ext3), ZFS, or New Technology File System (NTFS). In addition, the storage server can be implemented using industry standard hardware and software solutions without modifications or variations to accommodate the specific file management needs of the distributed processing environment or framework.

Having described embodiments of the present invention generally, attention is now directed to FIG. 1, which illustrates an operating environment in which some embodiments of the present invention may be utilized. Operating environment 100 includes a data analytics processing node 110, a data analytics processing node 120, a storage server 150, networks 190 and 192, and clients 160A and 160B. Operating environment 100 also includes persistent storage devices HDD 152A, HDD 152B, SSD 154A, and SSD 154B.

Data analytics processing nodes 110 and 120 each include one or more processors and memory cache. Processors 112 and 122 each may be any type of microprocessor, computer, server, central processing unit (CPU), programmable logic device, gate array, or other circuitry which performs a designated function. Processors 112 and 122 may also include processor readable instructions which configure a processing device to perform specified functions. Data analytics processing nodes 110 and 120 also contain one or more interfaces for communicating with networks, other processing nodes, or other devices. Data analytics processing nodes 110 and 120 may also contain other elements and may implement various elements in a distributed fashion.

Memory caches 114 and 124 each include data storage devices. For example, memory caches 114 and 124 may each include one or more hard disk drives (HDD), flash drives, tape drives, solid state drives (SSD), random access memory (RAM), read only memory (ROM), flash memory, or storage devices of another type, or a combination thereof. Those of ordinary skill in the art will appreciate that many additional devices and techniques for storing information may be used to implement memory caches 114 and 124. Memory caches 114 and 124 may be implemented within the processing nodes, as separate devices, or in a combined form. Memory caches 114 and 124 may be operated or utilized in a coordinated fashion and collectively referred to as distributed cache 130. Distributed cache 130 is a logical representation of the memory caches of two or more data analytics processing nodes.

Storage server 150 is a device attached to a network for the purpose of providing access to data or files. Storage server 150 may include a storage operating system that implements one or more file systems. Storage server 150 can be a server-class computer that provides storage services relating to the organization of information on writable, persistent storage media such as HDD 152A, HDD 152B, SSD 154A, and SSD 154B. Other types of persistent storage media are possible including a tape drive, flash memory, storage devices of another type, or a combination thereof. Storage server 150 is capable of interfacing to other devices directly or through a network as illustrated in FIG. 1. Clients 160A and 160B are applications or systems which communicate with storage server 150 though network 192 to access data stored on the persistent storage media.

While FIG. 1 illustrates storage server 150 as a monolithic, non-distributed device, those skilled in the art will appreciate that storage server 150 could be implemented as a distributed device or a virtual device. Moreover, the functions of storage server 150 may be adapted to a variety of storage server architectures and techniques, including a network attached storage (NAS) system, a storage attached network (SAN), or a direct-attached storage (DAS) system. The term "storage server" is broadly used to include such arrangements including a storage server that provides file-based access to data, block-based access to data, another type of access, or a combination thereof.

Networks 190 and 192 each include one or more devices for exchanging information. For example, networks 190 and 192 may each include a local area network (LAN), a wide-area network (WAN), a metropolitan area network (MAN), a telecommunications network, the Internet, or any combination thereof. Networks 190 and 192 may each also include routers, hubs, computers, servers, or other types of computing devices. Networks 190 and 192 may be wired networks, wireless networks, or a combination thereof.

Figure 2:
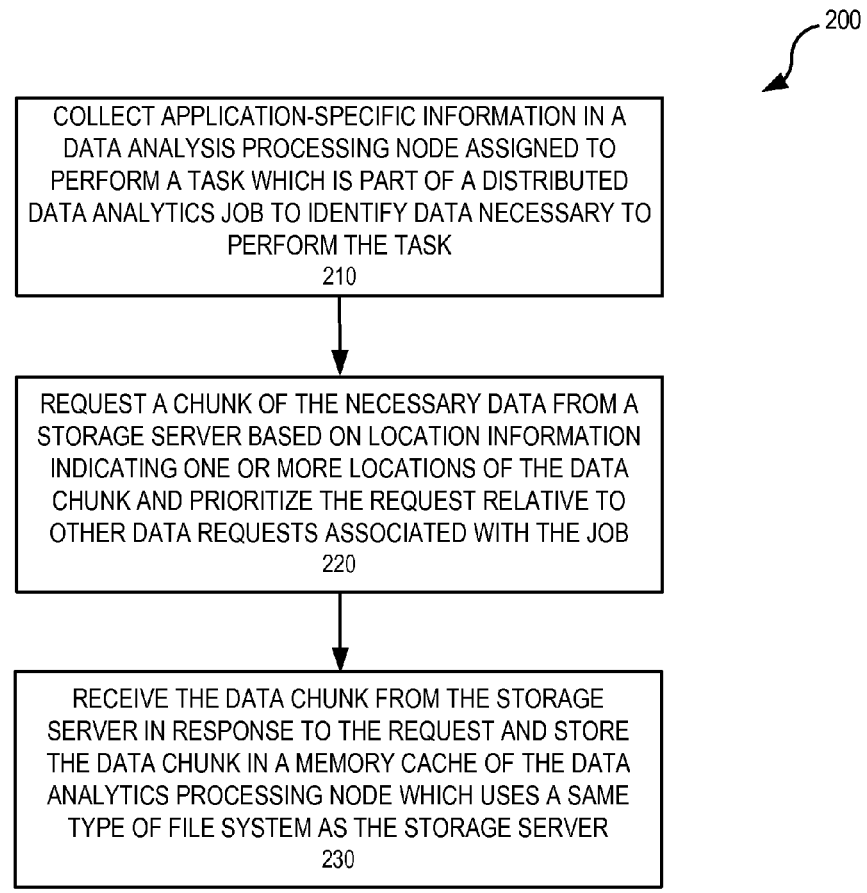
FIG. 2 illustrates an example of a method of performing a distributed data analytics job.

FIG. 2 illustrates method 200 of performing a distributed data analytics job. Method 200 is described below with respect to implementation in operating environment 100. However, implementation of method 200 in other operating environments is possible and the description below with respect to the elements of operating environment 100 is not intended to be limiting.

In one possible implementation of method 200, data analytics processing node 110 is assigned a task which is a portion of a distributed data analytics job and will be performed by processor 112. In one example, the job may be to search for all instances of an account number or a keyword in a large set of data. Data analytics processing node 110 collects application-specific information from the analytics framework, language internals, or operating system instrumentation to identify data necessary to perform the task (step 210). Data analytics processing node 110 requests a chunk of the necessary data from storage server 150 through network 190 based on location information indicating availability of the data chunk in storage server 150 (step 220). The location information may be stored in one or more of the data analytics processing nodes or may be stored in a job manager of the system.

The request for the data chunk is prioritized by data analytics processing node 110 relative to other data requests associated with the job. Data analytics processing node 110 receives the data chunk from storage server 150 in response to the request and stores the data chunk in memory cache 114 of the processing node which uses the same type of file system as storage server 150 (step 230).

Although a copy of the data chunk is stored in memory cache 114, this copy does not serve as a copy or redundant instance of the data chunk for data reliability purposes. Reliability copies reside on other devices and are managed by storage server 150 and/or other devices. Therefore, the copy of the data chunk in memory cache 114 could be lost or deleted without affecting the data reliability functions performed by storage server 150 or other file management devices or systems. In addition, the copy of the data chunk in memory cache 114 may not need to be accessed when storage server 150 is performing data reliability activities thereby minimizing the possibility that data reliability activities will slow the processing activities of data analytics processing node 110.

In some examples, data analytics processing node 110 performs the task in a Hadoop software framework. However, unlike traditional systems, memory cache 114 does not use HDFS and the files stored in memory cache 114 do not have to be ported into HDFS. Data analytics processing node 110 contains software tools which allow processor 112 to utilize and operate in a Hadoop environment without placing Hadoop or HDFS requirements on devices interfacing with or providing data to data analytics processing node 110. In this example, transfer of data from storage server 150 to memory cache 114 or memory cache 124 does not require moving the data out of one file system and into another. In some examples, storage server 150 interfaces with memory caches 114 and 124 using a standard protocol such as Network File System (NFS). Other protocols are possible including Internet Small Computer System Interface (iSCSI), Fibre Channel Over Internet (FCoE), or Common Internet File System (CIFS).

Figure 3:
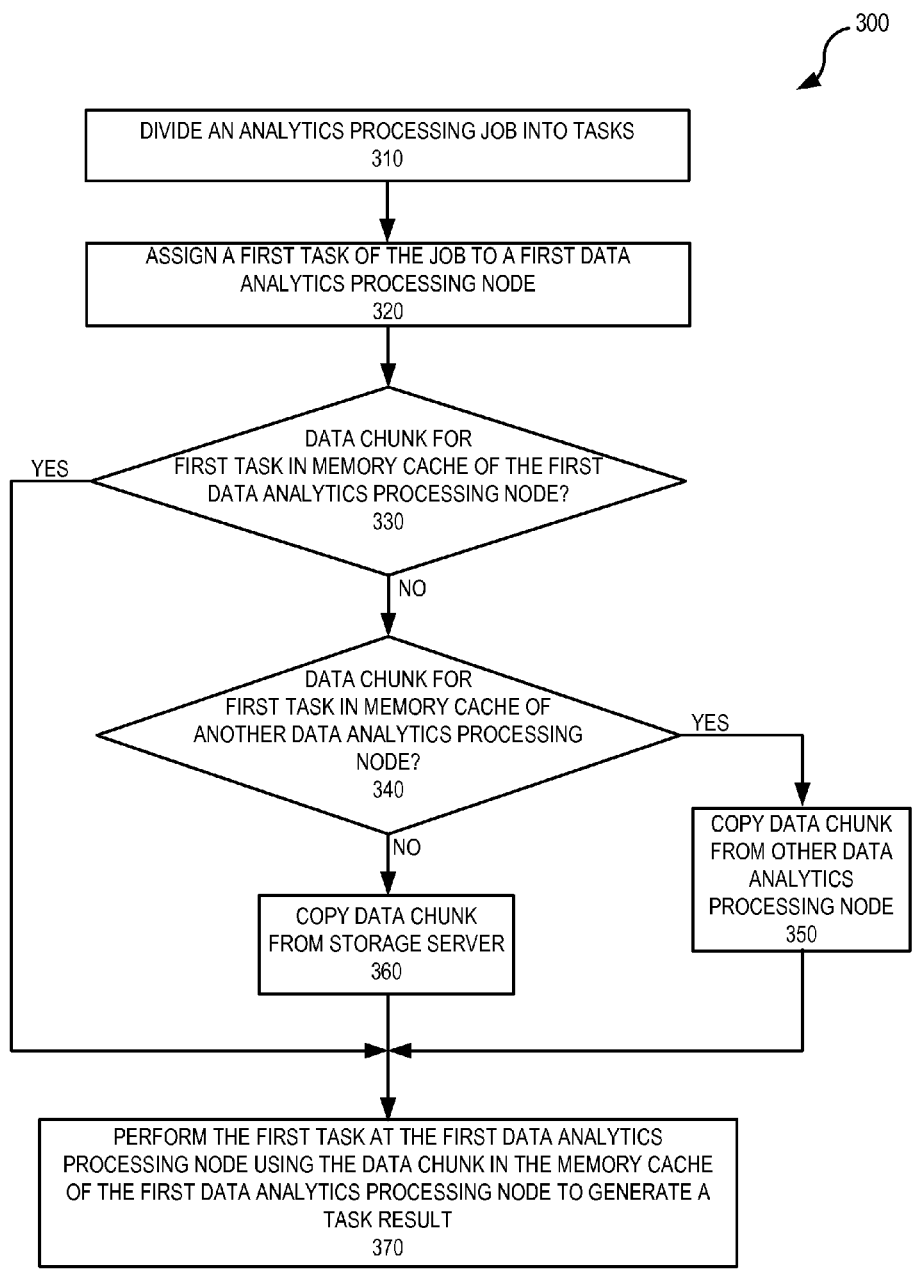
FIG. 3 illustrates an example of a method of performing a distributed data analytics job.

FIG. 3 illustrates method 300 of performing a distributed data analytics job which may be performed as an alternative to or in conjunction with method 200. Method 300 is also described with respect to operating environment 100 although implementations in other environments or systems are possible. In method 300, an analytics processing job is divided into tasks (step 310). One of the tasks is assigned to a processing node, data analytics processing node 120 for example (step 320). The job division and task assignment may be performed by one of the data analytics processing nodes or by a job manager. When processing large data sets it is desirable to have the data located in memory within, or as near as possible to, the processing node assigned to process the data in order to minimize access times, maximize processing throughput, and minimize congestion of any connections used to access data which is not available locally. Data analytics processing node 120 determines whether a data chunk necessary to perform the task is available in memory cache 124, the local memory cache of data analytics processing node 120 (step 330).

If the data chunk is not available in memory cache 124 but is available in memory cache 114 (step 340), data analytics processing node 120 copies the data chunk necessary to perform the task from memory cache 114 of data analytics processing node 110 to memory cache 124 (step 350). Alternatively, if data analytics processing node 110 has spare process capacity available, the task may be scheduled on data analytics processing node 110 where the data is already available locally. The communication path between the processing nodes may be a direct connection or may be through other networks, including network 190. Data analytics processing node 120 may direct access to memory cache 114 or may have to transmit a request for the data to data analytics processing node 110 and wait for a response.

If the data chunk is not available in the memory caches of any of the processing nodes, it is copied from storage server 150 to memory cache 124 (step 360). Data analytics processing node 120 then performs the first task using the data chunk in memory cache 124 and generates a result of performing the task (step 370). It should be understood that the typical task may require processing on multiple data chunks and may involve multiple requests for data from storage server 150 and/or the other processing nodes. For example, a first data chunk for a task may be requested from storage server 150 while a second data chunk for the task is requested from memory cache 114 of data analytics processing node 110.

Figure 4:
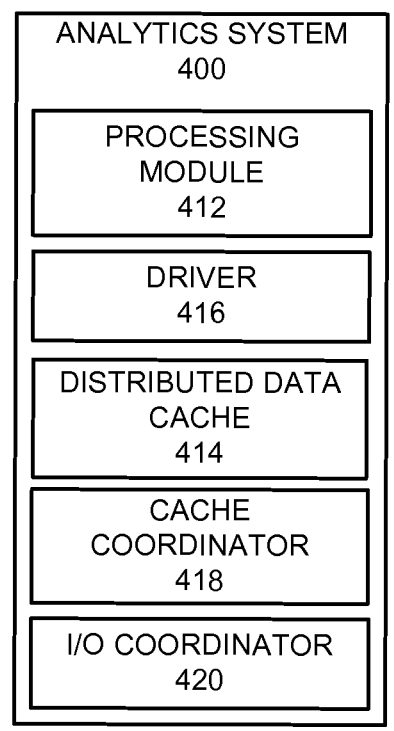
FIG. 4 illustrates an example of a distributed data analytics system.

FIG. 4 illustrates an example of an analytics system for performing data analytics jobs. Analytics system 400 includes a processing module 412, a driver 416, a distributed cache 414, a cache coordinator 418, and an I/O coordinator 420. Each of these elements can be embodied as special-purpose hardware circuitry, or as general-purpose programmable circuitry appropriately programmed with software or firmware, or as a combination of such forms. Processing module 412 performs processing tasks and is one example of processor 112 or processor 122. Driver 416 is an application-level driver for collecting application-specific information from processing module 412 and other processes being performed within analytics system 400. The collected application-specific information may include the size of the chunk being currently processed, an identifier of the task currently running, the task's priority relative to other tasks, the owner of the submitted job, the type of application, or other similar information. Driver 416 may be implemented as a library embedded within an application running on processing module 412 and may create an additional memory cache within the address space of the application.

Distributed data cache 414 is one example of memory cache 114 or memory cache 124. Distributed data cache 414 is illustrated as being contained within analytics system 400, but could be in an alternate location and may simultaneously provide cache services for multiple analytics systems or processing nodes. Distributed data cache 414 is operatively coupled with driver 416 and operatively coupled with a storage server, to cache data for performing the processing jobs based on the application-specific information.

Cache coordinator 418 is operatively coupled between distributed data cache 414 and processing module 412, to retrieve from the storage server a portion of the data not located in distributed cache 414 based on location information indicating one or more locations of the data. Cache coordinator 418 manages distributed cache 414 and acts as a liaison between the process module 412 and the various other devices or locations where data may be stored. Cache coordinator 418 may also interface with a job scheduler or job manager such that tasks are scheduled in locations where a large fraction of the associated data is located.

I/O coordinator 420 prioritizes I/O operations between distributed cache 414 and a storage server. I/O coordinator 420 prioritizes the I/O operations based on information from processing module 412 as well as information regarding the operation of the storage server. Each I/O operation may be tagged with a time-to-service (TTS) value based on information indicating when the associated data will be processed. In addition, each I/O may be tagged with a time-to-live (TTL) value pertaining to expected data reuse. This information enables the storage sever to support multiple applications or systems which may have different service level objectives (SLOs).

Figure 5:
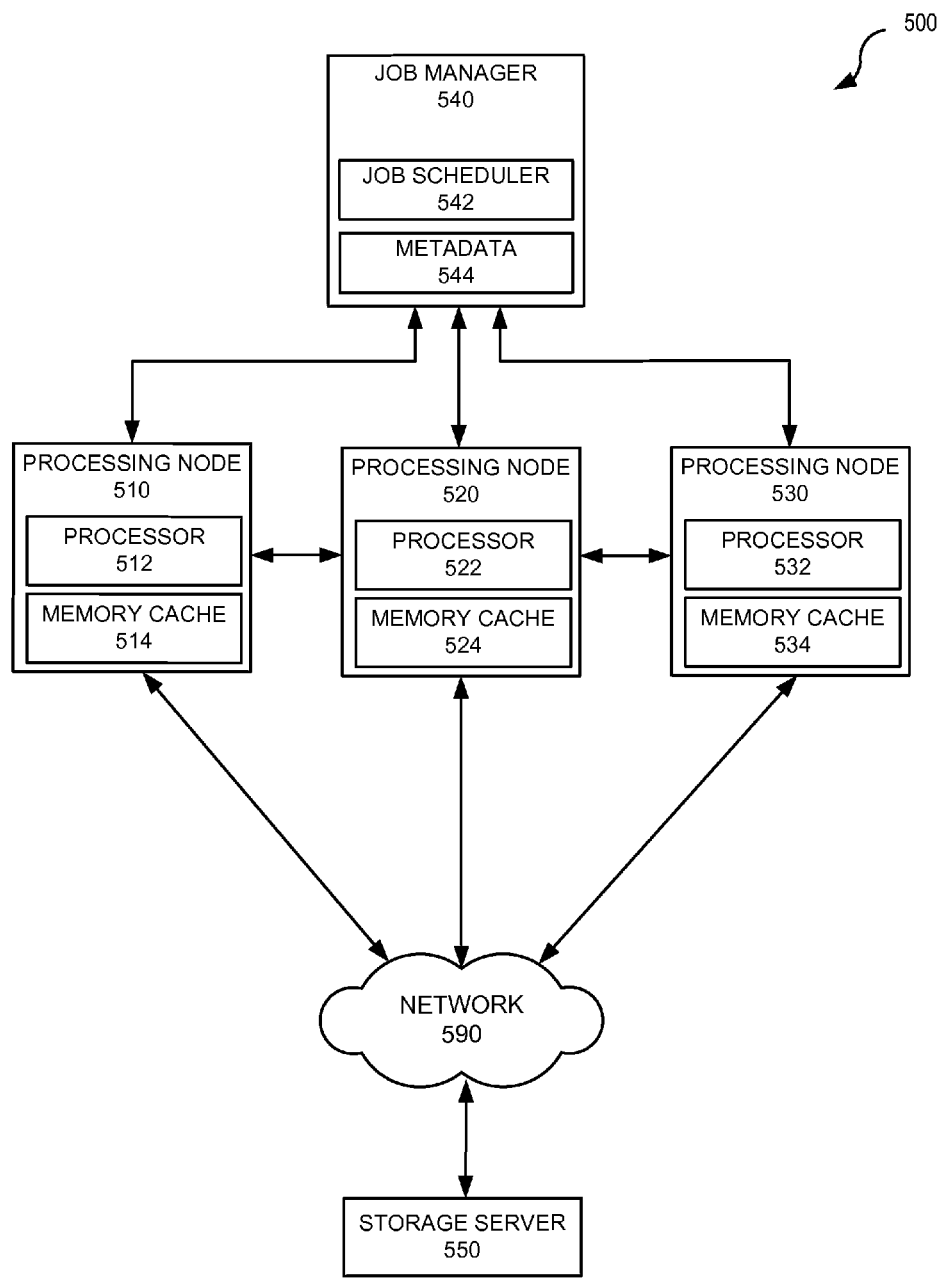
FIG. 5 illustrates an alternative implementation of a distributed data analytics system.

FIG. 5 illustrates an example of a distributed data analytics system in another embodiment of the invention. Distributed data analytics system 500 comprises processing node 510, processing node 520, processing node 530, job manager 540, storage server 550, and network 590. Elements of distributed data analytics system 500 can be examples of corresponding elements in FIGS. 1 and 4. However, each of the elements of distributed data analytics system 500 may have alternate configurations, have alternate features, or operate in alternate manners with respect to the corresponding elements in FIGS. 1 and 4. The processing nodes may also include a cache coordinator, driver, and/or I/O coordinator as in the analytics system 400. In one variation, the functions of one or more of the cache coordinator, driver, and I/O coordinator may also be included in one of the elements illustrated in FIG. 5.

Job manager 540 includes a job scheduler 542 and metadata 544. Job manager 540 performs a coordination function relating to the processing of tasks performed by the processing nodes. This coordination function may include one or more of: receiving jobs, assigning jobs, dividing jobs, scheduling jobs, monitoring jobs, transmitting job information, processing job results, combining job results, reporting job results, or job coordination functions. Job manager 540 may be implemented in special-purpose hardware, programmable hardware, or a combination thereof. Job manager 540 is illustrated as a standalone element and may be implemented in a separate computing device, but may also be implemented in a device which performs other functions, including a distributed implementation within one or more processing nodes.

Job scheduler 542 performs the assignment and scheduling of jobs to processing nodes, including processing nodes 510, 520, and 530. Job scheduler 542 and metadata 544 may each be implemented in special-purpose hardware, programmable hardware, or a combination thereof. Job scheduler 542 and metadata 544 may be implemented in a separate device as illustrated, in a distributed fashion, or in one or more of processing nodes 510, 520, and 530. Job manager 540 may perform these functions in combination with one or more of the memory caches.

Metadata 544 includes information describing the contents of memory caches 514, 524, and 534. Metadata 544 is updated as data is copied to or deleted from the memory caches 514, 524, and 534. When job scheduler 542 assigns tasks to the processing nodes, the tasks may be assigned to the processing nodes based on whether the data needed to perform the task, or a portion of the data, is already present in the associated memory caches. Once a processing node is performing a task and a determination is made that additional data is needed, the processing node may also access metadata 544 to determine if the data can be retrieved from one of the other processing nodes as an alternative to requesting the data from storage server 550. For various reasons, retrieving the needed data from one of the processing nodes may be more efficient than retrieving the data from storage server 550 or another source. Job scheduler 542 and metadata 544 may each be implemented in special-purpose hardware, programmable hardware, or some combination thereof.

Figure 6A:
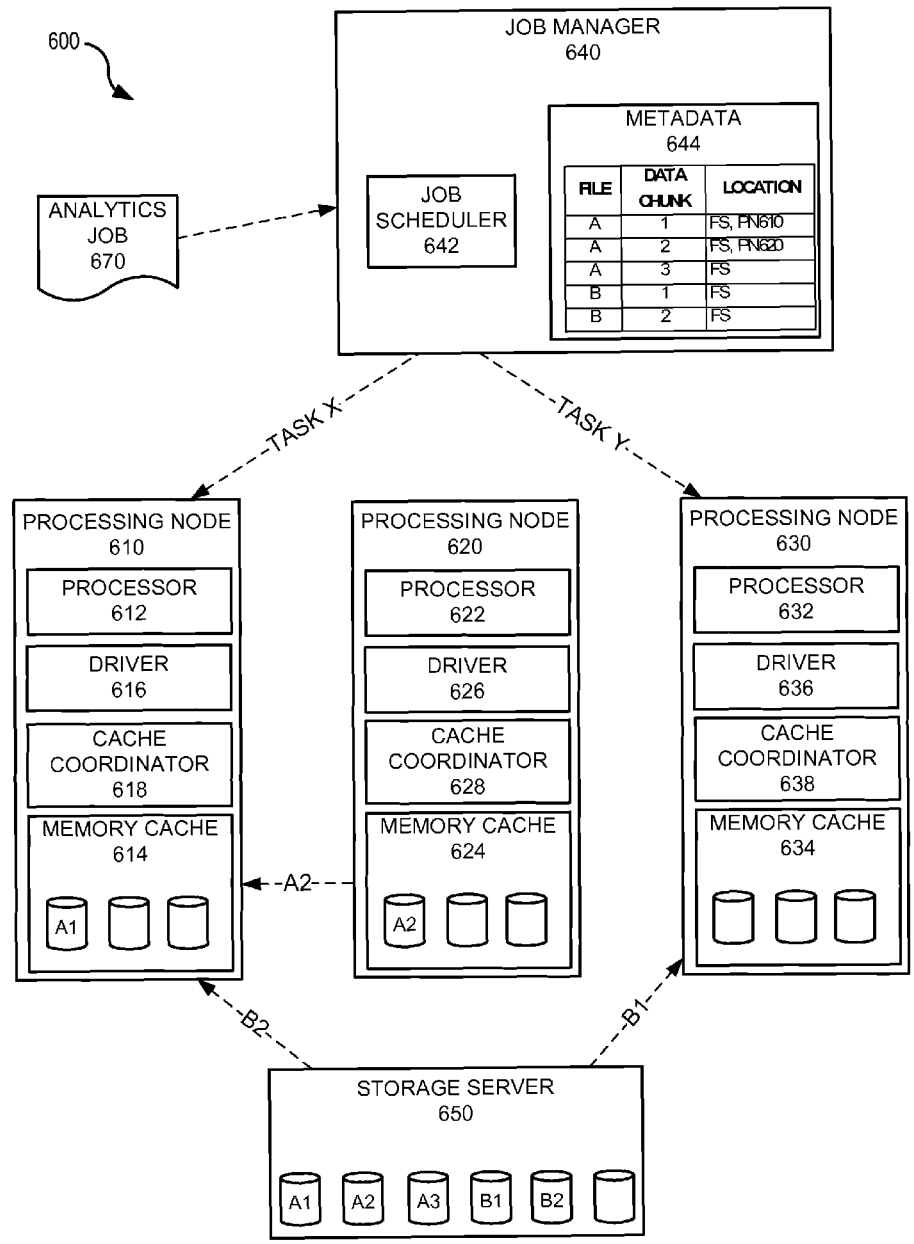
FIG. 6A illustrates the commencement of a distributed data analytics processing job in a distributed data analytics system.

FIG. 6A illustrates distributed data analytics system 600. Distributed data analytics system 600 has similarities to the distributed data analytics systems of previous figures but may have an alternate configuration, features, or operation. Similar to the processing nodes of FIG. 3, processing nodes 610, 620, and 630 each include a processor and memory cache. In addition, each of the processing nodes also includes a driver, a cache coordinator, and may include and I/O coordinator.

Drivers 616, 626, and 636 include application-level drivers within the distributed processing environment. The driver in any given node enables the processing node to take advantage of application-level information for optimization of interfaces to data sources. The driver may be a library embedded within a data processing application running on the node which is capable of creating caches within the application address space. This enables faster data access without the additional latency of crossing the operating system (OS) kernel space boundary. The driver may also be capable of monitoring or analyzing the program's characteristics to perform prefetching of data. Since many data analytics processes analyze data sequentially, data may be predictively prefetched by monitoring the progress of the processing activities. Prefetching further reduces latency by retrieving data from other memory caches of the storage server prior to a need for the data by the processing node. The "reflection" capabilities of Java may also be used to implement these capabilities. The drivers may be configured to perform data management in customized block sizes. For example, the driver may be configured to move data in 1 MB blocks even though the typical file system manages data in 4 KB blocks.

In some cases, TTS values may be used to determine when a data chunk will be needed and a request for the data timed accordingly. Data requests may also take into consideration the expected source of the data and the associated latencies in determining the timing of a request. Data output from the processing nodes may be handled in a similar manner. Coordination of the data input and output may be performed in the driver or may be performed by a separate I/O coordinator. A TTL value that provides information about expected data may also be included with data requests. Storage server 650 may use this and other information to prioritize data requests in order to further optimize the performance of the entire system.

Cache coordinators 618, 628, and 638 are liaisons between the distributed processing environment and memory caches 614, 624, and 634, which are not subject to the limitations of this environment. For example, in the case of a Hadoop implementation, processors 612, 622, and 632 may be performing processing activities in a Hadoop environment while cache coordinators 618, 628, and 638 act as a liaisons between these processing activities and the memory caches which are not utilizing HDFS. Cache coordinators 618, 628, and 638 may each also arrange the data sequentially within the associated memory cache in order to maximize efficiency when the data is accessed. Unlike HDFS, the cache coordinator can increase or reduce the number of cached data replicas, as needed, for performance reasons.

Cache coordinators 618, 628, and 638 are illustrated as individual elements of the processing nodes but perform coordinated functions between the processing nodes and job scheduler 642. The cache coordinator may also be implemented in a centralized fashion and communicate with the processing nodes to gather information about the memory caches of the processing nodes. The cache coordinators interface with job scheduler 642 and utilize metadata 644 in determining an assignment of tasks among the processing nodes based on the contents of the memory caches. In some cases, a task will be assigned to the processing node associated with a memory cache which already includes a large percentage of the data needed to perform the task. In other cases, a task may be assigned to one or more processing nodes which have the most efficient access to the first data chunks needed to start the task. Other assignment criteria are possible.

In addition, one or more cache coordinators also manage the process of retrieving or copying data from the other memory caches and/or storage server 650 when other data is needed by the processing node. The cache coordinators not only manage the cache on their individual processing nodes but coordinate these activities between each other and with job manager 640 and job scheduler 642 to make more efficient use of the memory caches and the data residing in them towards accomplishing the overall distributed data analytics job.

FIG. 6A illustrates the commencement of a distributed processing job in a distributed data analytics system. A request to perform analytics job 670 is received by job manager 640 and processed by job scheduler 642. Among other functions, job scheduler 642 determines how analytics job 670 should be broken apart into individual tasks and assigned to the processing nodes. The job may be broken down into tasks based on how the data files are divided into chunks and/or where copies of those chunks reside. For purposes of this example, analytics job 670 is broken into only two tasks, task X and task Y, and only two data files, A and B, are used in this example. It should be understood that more complex job breakdowns and more extensive data sets are typical.

Job scheduler breaks analytics job 670 apart into tasks and assigns those tasks based, at least in part, on metadata 644. Metadata 644 includes information about the data contained in the memory caches and/or the storage server. For example, metadata 644 contains information about the location of each instance of files A and B as well as the location of each instance of each data chunk of those files. For example, prior to starting analytics job 670, data chunk 2 of file A is available in storage server 650 and the memory cache of processing node 620. Because the data chunks which reside in the memory caches are not used for reliability purposes, none of the data chunks in the memory caches are the primary instances of the data. Storage server 650, or another device, will typically manage other copies of the data which are stored in other locations for data reliability or backup purposes. These other copies are not necessarily reflected in metadata 644.

In the example of FIG. 6A, job scheduler 642 determines that task X will require, at least, the processing of data chunks A1, A2, and B2. Ideally, job scheduler 642 would assign this task to a processing node which already contained all of these data chunks in its memory cache. However, metadata 644 indicates that none of the processing nodes currently contains all three data chunks, so a determination is made as to which processing nodes currently contain the largest number of the needed data chunks. Both processing node 610 and processing node 620 each initially contain one of the three needed data chunks, A1 and A2 respectively. Therefore, the decision between the two processing nodes may be based on other task assignments, processing capability, expected downtime, desired end states of the individual memory caches, or other factors. In this case, job scheduler 642 assigns task X to processing node 610.

Also for purposes of this example, job scheduler 642 determines that task Y of analytics job 670 requires data chunk 1 of file B. Based on metadata 644, job scheduler 642 determines that data chunk B1 is currently only available in storage server 650. Consequently, the assignment of task Y will not be made based on current contents of the memory caches and will be assigned based on other potential factors as described above. In this example, task Y is assigned to processing node 630.

Based on the assignment of task X, processing node 610 will need to obtain data chunks A2 and B2 because they are currently not available in memory cache 614. Because data chunk A1 is already available, processor 612 may begin the processing activities on data chunk A1. Because memory caches 614, 624, and 634 are collectively treated as a distributed cache of processing node 610, processing activities can begin in the compute tier knowing that data chunk A2 can be retrieved relatively quickly and made available in local memory cache 614. Although data chunk A2 could be retrieved from storage server 650, it will typically be more efficient to retrieve it from one of the other memory caches. Although the processing is occurring in a distributed data analytics software framework, cache coordinator 618 manages the files in memory cache 614 and the movement of files between the memory caches in a manner which is not subject to the file system requirements of the distributed data analytics framework. Cache coordinator 618, or a combination of cache coordinators, may also create multiple instances of a data chunk across the various memory caches if, for example, it is needed at multiple processing nodes or if a task is subdivided to another processing node for performance reasons.

In addition, data chunk B2 is needed at processing node 610 in order to perform task X. Based on metadata 644, it is known that data chunk B2 is not available in one of the other memory caches. Therefore, data chunk B2 must be obtained or copied from storage server 650. Obtaining the copies of A2 and B2 is coordinated by driver 616 and the interface with storage server 650 may be further assisted by an I/O coordinator as described previously. It is assumed for purposes of this example, that the data chunks will be sequentially processed in the following order: A1, A2, B2. Even though A2 will be needed before B2, driver 616 may reorder the requests for the data knowing that it will take longer for storage server 650 to respond with B2 than it will take to get A2 from memory cache 624. In other words, the data requests may be reordered by driver 616 based on determinations regarding when the data will be needed, as well as characteristics and responsiveness of the data source, to maximize the throughput of task X.

In some cases, B2 may be received in sub-chunks. These sub-chunks may be received out of order and may even be received from different sources in some cases. While most file management systems are capable of storing portions of a file in different physical locations, or out of order, driver 616 and/or cache coordinator 618 may order the portions of B2 and store them in adjacent locations of memory cache 614 in sequential order in order to make access times faster when the processing activities reach this data. In addition, storage locations may be chosen relative to each other for data chunks based on the order of need towards the same objective. For example, even if B2 is received before A2, B2 may be stored in a manner that leaves sequential physical space available for A2 when it is received. It should be understood that many jobs and tasks will require many more data chunks and the management of these data chunks and their inter-relationships will be more complex than the examples described here.

When A2 and B2 are copied into memory cache 614, they are not required to be transferred into a file system associated with the distributed processing software framework, such as HDFS, in which processor 612 is performing task X. For example, when B2 is copied from storage server 650 to memory cache 634, it does not have to be transferred into a file system associated with the MapReduce environment. In the example of a Hadoop implementation, B2 does not have to be brought into HDFS to be stored in memory cache 634. In some cases, additional address space cache may exist within the distributed processing software framework and data may be transferred into this address space for processing.

Also in FIG. 6A, task Y is assigned to processing node 630. Cache coordinator 638 determines that necessary data chunk B1 is not available in memory cache 634 or the memory caches of the other processing nodes. This determination may be made through use of metadata 644 and/or with the assistance of the other cache coordinators. Consequently, B1 is requested from storage server 650 using one or more of the methods previously described.

Figure 6B:
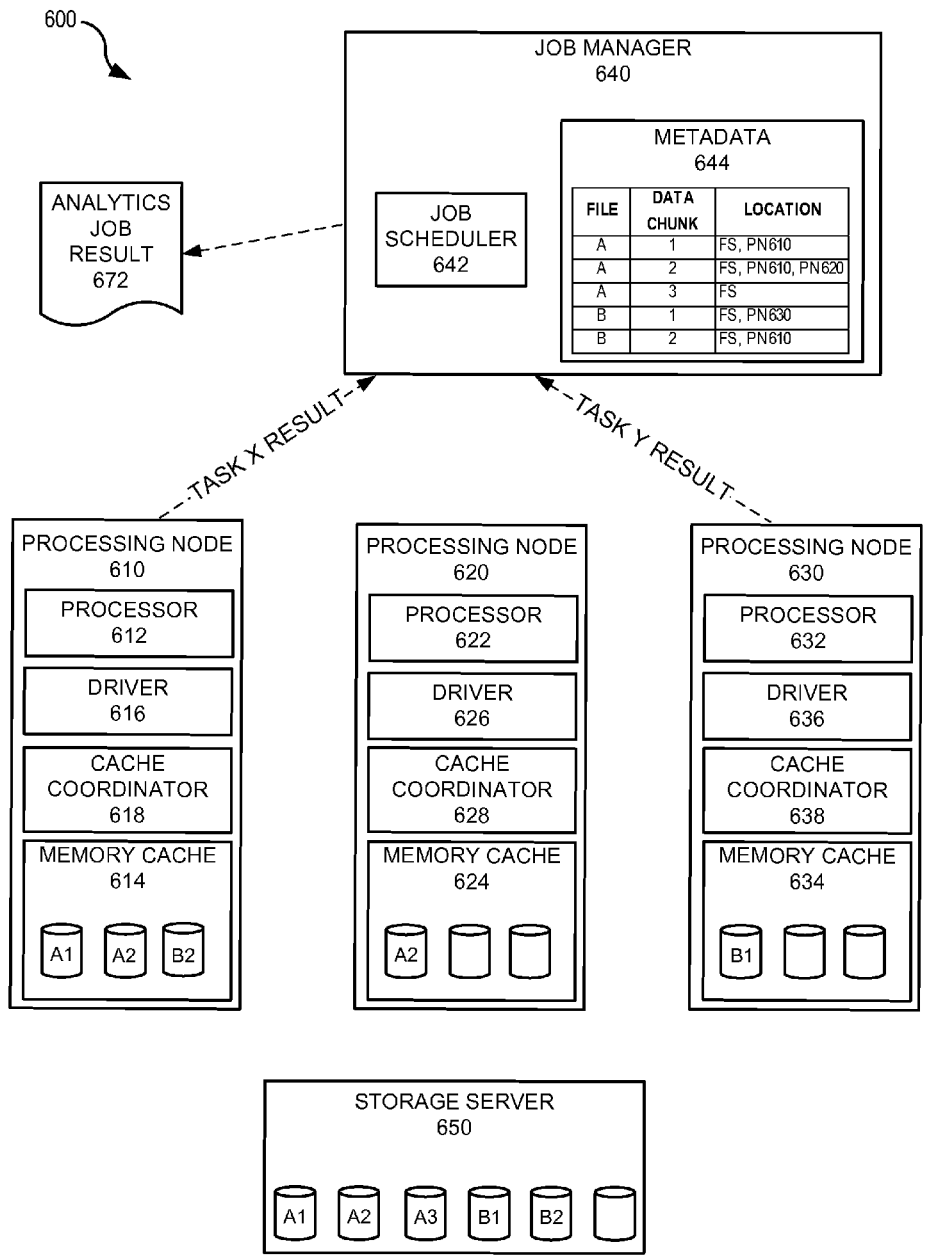
FIG. 6B illustrates the completion of a distributed data analytics processing job in a distributed data analytics system.

FIG. 6B illustrates the completion of distributed data analytics job 670 commenced in FIG. 6A. After processing, memory cache 614 contains data chunks A1, A2, and B2. Memory cache 624 still contains A2. However, in an alternate operation, A2 may have been deleted from memory cache 624 when it was copied to memory cache 614. Deleting copies of the data chunks from one or more of the memory caches is not problematic because these instances of the data do not serve data reliability purposes. Also, memory cache 634 contains B1 after the processing is complete. The state of the memory caches, and the storage server if appropriate, are updated in meta data 644.

Results of task X and task Y are written to the local storage on the processing nodes, and the status of the tasks are reported to job manager 640 by processing nodes 610 and 630, respectively. The status of individual tasks may be transmitted to job manager 640 at the same time, or at different points in time. The task results are combined into a single result for the job by job manager 640. In a MapReduce environment, this combining of the results is commonly referred to as the Reduce step. Based on the individual results, job manager 640 prepares analytics job result 672.

In some cases, a processing node may modify a data chunk during the processing activities. If the modifications are not temporary and are to be applied to the data chunk permanently, these modifications must be communicated back to storage server 650. The associated cache coordinator will be responsible for coordinating or instructing deletion any old, unmodified instances of the data chunk from the memory caches of the other processing nodes. The driver will be responsible for transferring a copy of the modified data chunk, or information about the modifications, to storage server 650. Because the memory cache uses the same file system as the storage server, no file system conversion is necessary in this process. The storage server makes updates to the data chunk based on the modifications and performs data reliability activities to create backups of the modified data chunk independent of the memory caches.

The examples and figures herein describe systems using a single storage server. However, it should be understood that some implementations can include multiple storage servers, including multiple types of storage servers. The storage server may also be distributed across multiple storage server nodes. The drivers and I/O coordinators will have the additional tasks of coordinating data exchanges with the multiple storage servers or storage server nodes.

Figure 7:
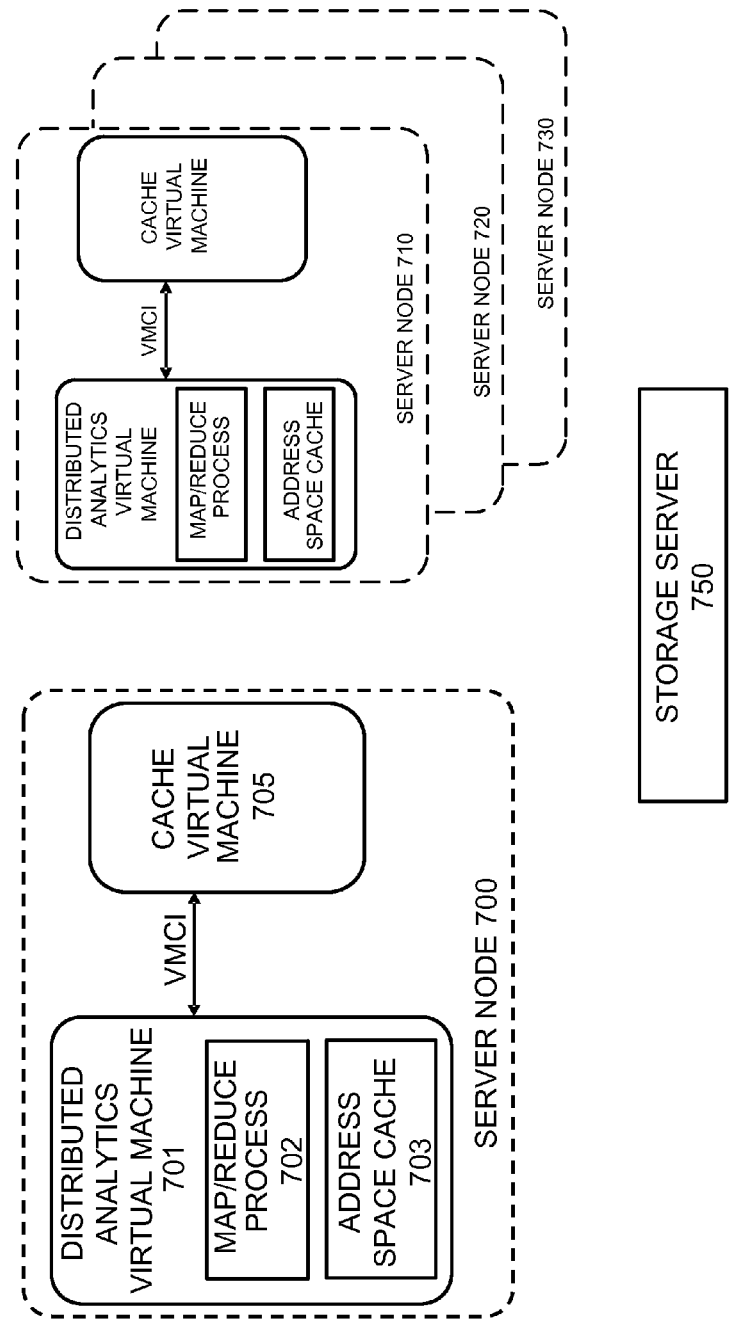
FIG. 7 illustrates an alternative implementation of a distributed data analytics system.

FIG. 7 illustrates an alternative implementation of a distributed data analytics system. In the embodiment of FIG. 7, the distributed data analytics system is implemented as one or more virtual machines. A virtual machine is a software implementation of a computing machine which is capable of executing programs like a physical machine. Multiple virtual machines may be implemented on a single hardware platform, but operate independently from each other. Each of server nodes 700, 710, 720, and 730 in FIG. 7 may be implemented on a separate hardware platform or together on a single hardware platform. More or fewer server nodes are possible. Each server node includes a distributed analytics virtual machine. For example, server node 700 includes distributed analytics virtual machine 701. Each virtual machine may be a system virtual machine that supports execution of a complete OS or may be a process virtual machine designed to run only the processes associated with the distributed analysis. The distributed data analytics system of FIG. 7 may be operated as described in any of the previous examples or according to the teachings of FIGS. 1-6.

In FIG. 7, distributed analytics virtual machine 701 includes Map/Reduce process 702 and address space cache 703. Address space cache 703 is within the application address space of distributed analytics virtual machine 701 and enables fast access to the data without the latency of crossing an OS kernel space boundary. In addition, distributed analytics virtual machine 701 has access to cache virtual machine 705. Cache virtual machine 705 creates a caching layer that can easily or automatically be adapted to meet changing needs of distributed analytics virtual machine 701. The interface from distributed analytics virtual machine 701 to cache virtual machine 705 is by way of a virtual machine communication interface (VMCI). Other interfaces are possible. In some embodiments, cache virtual machine 705 may be created to cache data closer to the location of computation. It should be understood that many other virtual machine configurations and interfaces are possible.

In one embodiment, a fixed amount of physical memory may be allocated to the group of virtual machines in FIG. 7. As needs of the virtual machines change, the amount of virtual cache allocated to each virtual machine can be varied. This is accomplished through software and does not require physical changes to the configuration. In another example, a data set is in the cache virtual machine of server node 710 but is needed by server node 700. This data could be made available to server node 700 by simply reassigning the cache virtual machine of server node 710 to server node 700 rather than actually copying the data from one physical memory location to another. In yet another example, virtual cache machine 705 could be expanded to encompass data accessible through storage server 750. The methods of use and benefits of the memory caches previously discussed and illustrated in FIGS. 1-6 are also applicable to the virtual cache implementations and may potentially extend further to the flexibility and adaptability in the virtual implementations.

As in previous examples, data management solutions or a data reliability plan can be implemented on storage server 750 without affecting the data stored in the cache virtual machines. For example, flexible redundancy policies, security policies, archival solutions, RAID, deduplication, and other data management activities can be implemented on the storage server without having to adapt these tools to accommodate the file system of the distributed computing software framework, including HDFS. The cache virtual machines include a stateless caching tier which is optimized for performance of the processing activities.

Embodiments of the present invention include various steps and operations, which have been described above. A variety of these steps and operations may be performed by hardware components or may be embodied in machine-executable instructions, which may be used to cause one or more general-purpose or special-purpose processors programmed with the instructions to perform the steps. Alternatively, the steps may be performed by a combination of hardware, software, and/or firmware.

Embodiments of the present invention may be provided as a computer program product which may include a machine-readable medium having stored thereon non-transitory instructions which may be used to program a computer or other electronic device to perform some or all of the operations described herein. The machine-readable medium may include, but is not limited to optical disks, compact disc read-only memories (CD-ROMs), magneto-optical disks, floppy disks, ROMs, random access memories (RAMs), erasable programmable read-only memories (EPROMs), electrically erasable programmable read-only memories (EEPROMs), magnetic or optical cards, flash memory, or other type of machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link.

The phrases "in some embodiments," "according to some embodiments," "in the embodiments shown," "in other embodiments," "in some examples," and the like generally mean the particular feature, structure, or characteristic following the phrase is included in at least one embodiment of the present invention, and may be included in more than one embodiment of the present invention. In addition, such phrases do not necessarily refer to the same embodiments or different embodiments.

While detailed descriptions of one or more embodiments of the invention have been given above, various alternatives, modifications, and equivalents will be apparent to those skilled in the art without varying from the spirit of the invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof. Therefore, the above description should not be taken as limiting the scope of the invention, which is defined by the claims.

What is claimed is:

1. A method of performing a distributed data analytics job which includes a plurality of tasks, the method comprising:
collecting application-specific information in a processing node assigned to perform a first task of the plurality of tasks to identify necessary data to perform the first task;
requesting a data chunk of the necessary data from a storage server based on location information indicating one or more locations of the data chunk and prioritizing the request relative to other data requests associated with the job; and
receiving the data chunk from the storage server at the processing node in response to the request and storing the data chunk in a memory cache of the processing node, the memory cache of the processing node using a same type of file system as the storage server, wherein the type of file system used by the memory cache of the processing node and the storage server is different from a type of a distributed file system used by the processing node.

2. The method of claim 1 wherein the first task is assigned to the processing node based on contents of the memory cache.

3. The method of claim 1 further comprising:
requesting a second chunk of data needed to perform the first task from a memory cache of another processing node based on the location information and prioritizing the request for the second chunk relative to the other data requests associated with the job.

4. The method of claim 1 further comprising:
transferring the data chunk from the memory cache into an address space of a distributed processing environment of the processing node; and
performing the first task in the distributed processing environment to generate a result of the first task.

5. The method of claim 4 wherein performing the first task includes prefetching additional data for the processing node prior to a need for the additional data by generating a prioritized request for the additional data if the additional data is not available in the memory cache.

6. The method of claim 4 further comprising:
combining the result of the first task with results of the other tasks at a central node to produce a result of the distributed data analytics job.

7. The method of claim 6 wherein producing the result of the distributed data analytics job includes performing a MapReduce process.

8. The method of claim 1 further comprising executing a data reliability plan at the storage server, including making a backup copy of the data chunk, wherein the copy of the data chunk in the memory cache is not used as a backup copy.

9. The method of claim 8 wherein the data reliability plan is executed without affecting a state of the memory cache.

10. The method of claim 1 wherein the storage server comprises a Network Attached Storage (NAS) device.

11. The method of claim 1 wherein the storage server comprises a Storage Area Network (SAN) device.

12. An analytics system comprising:
a processing module to perform processing jobs;
an application-level driver to collect application-specific information from the processing module;

a distributed data cache, operatively coupled with the application-level driver and operatively coupled with a storage server, to cache data for performing the processing jobs based on the application-specific information, wherein the distributed data cache and the storage server use a same type of file system, wherein the type of file system used by the memory cache of the analytics system and the storage server is different from a type of a distributed file system used by the analytics system;

a cache coordinator, operatively coupled between the distributed data cache and the processing module, to retrieve from the storage server a portion of the data for performing the processing jobs not located in the distributed data cache based on location information indicating one or more locations of the data portion; and an input/output (I/O) coordinator to prioritize I/O operations between the distributed data cache and the storage server.

13. The analytics system of claim 12 further comprising a job manager to assign the processing jobs based on the location information.

14. The analytics system of claim 12 wherein the distributed data cache is configured to relocate a portion of the data stored in the distributed data cache to improve performance of the processing module.

15. The analytics system of claim 12 wherein the distributed data cache is configured to update the location information after retrieving the portion of the data.

16. The analytics system of claim 12 further comprising a secondary storage device to provide a backup storage location for the storage server, wherein the secondary storage device is separate from the distributed data cache.

17. The analytics system of claim 12 wherein caching data includes prefetching additional data for the processing module prior to a need for the additional data.

18. The analytics system of claim 12 wherein the distributed data cache includes data cache associated with the processing module and data cache associated with a second processing module.

19. The analytics system of claim 12 wherein the storage server comprises a Network Attached Storage (NAS) device.

20. The analytics system of claim 12 wherein the storage server comprises a Storage Area Network (SAN) device.

21. The analytics system of claim 12 wherein the I/O operations are prioritized based on an expected response time of the storage server.

22. A non-transitory machine-readable medium comprising non-transitory instructions which, when executed by one or more processors, direct the one or more processors to:

assign first and second processing tasks of a distributed data analytics processing job to different processing nodes of a plurality of processing nodes based on contents of memory caches of the processing nodes;

collect application-specific information in a processing node assigned to perform the first task to identify data chunks necessary to perform the first task;

request a first data chunk of the data chunks from a memory cache of another processing node based on location information indicating one or more locations of the data chunks;

request a second data chunk from a storage server based on location information and prioritize the request relative to the request for the first data chunk;

store the received first and second data chunks in a memory cache of the processing node, wherein the memory cache of the processing node uses a same type of file system as the storage server, wherein the type of file system used by the memory cache of the processing node and the storage server is different from a type of a distributed file system used by the processing node; and transfer the first and the second data chunks from the memory cache into address space of a distributed processing software environment of the processing node in order of need by the processing node.

23. The machine-readable medium of claim 22 wherein the instructions further direct the one or more processors to:

perform the first task to generate a first task result; and combine the first task with a result of the second processing task producing a result of the distributed data analytics processing job.

24. The machine-readable medium of claim 23 wherein performing the first task includes prefetching additional data for the processing node assigned to perform the first task prior to a need for the additional data.

25. The machine-readable medium of claim 23 wherein the instructions further direct the one or more processors to make one or more backup copies of the first and the second data chunks to satisfy a data reliability plan, wherein the backup copies are not stored in the memory caches of the processing nodes.

26. The machine-readable medium of claim 22 wherein data is transferred between the memory caches and the storage server using one or more of: Network File System (NFS), Internet Small Computer System Interface (iSCSI), or Fibre Channel Over Ethernet (FCoE).

27. The machine-readable medium of claim 22 wherein the second data chunk is requested before the first data chunk and the first data chunk is processed before the second data chunk.

* * * * *